(12) United States Patent
Gelman et al.

(10) Patent No.: US 11,548,657 B2
(45) Date of Patent: Jan. 10, 2023

(54) AERIAL VEHICLE SECURING SYSTEM AND METHOD

(71) Applicant: ISRAEL AEROSPACE INDUSTRIES LTD., Lod (IL)

(72) Inventors: Gil Gelman, Neta (IL); David Elnekave, Mazkeret Batya (IL); Yoav Herzig, Ein Sarid (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/980,541

(22) PCT Filed: Mar. 11, 2019

(86) PCT No.: PCT/IL2019/050266
§ 371 (c)(1),
(2) Date: Sep. 14, 2020

(87) PCT Pub. No.: WO2019/180695
PCT Pub. Date: Sep. 26, 2019

(65) Prior Publication Data
US 2021/0002002 A1    Jan. 7, 2021

(30) Foreign Application Priority Data
Mar. 22, 2018 (IL) .......................... 258310

(51) Int. Cl.
*B64F 1/12* (2006.01)
*B64F 1/22* (2006.01)
*B64C 39/02* (2006.01)

(52) U.S. Cl.
CPC ................ *B64F 1/22* (2013.01); *B64F 1/12* (2013.01); *B64C 39/024* (2013.01)

(58) Field of Classification Search
CPC ...... B64F 1/02; B64F 1/12; B64F 1/14; B64C 2201/18; B64C 2201/182
See application file for complete search history.

(56) References Cited

U.S. PATENT DOCUMENTS 3,801,050 A    4/1974  Stone
4,236,686 A    12/1980 Barthelme et al.
(Continued)

FOREIGN PATENT DOCUMENTS

CN    105667768 A    6/2016
CN    206318030 U    7/2017
(Continued)

OTHER PUBLICATIONS

"EASA Approves Max Gross Weight Increase for MD 900/902 Explorer", http://www.aero-news.net/index.cfm?do=main.textpost&id=608a3aae-5c1e-4313-a312-8848a8fccc02, last accessed Jul. 31, 2019, Apr. 30, 2015, 2 pages.
(Continued)

*Primary Examiner* — Philip J Bonzell
(74) *Attorney, Agent, or Firm* — Dorsey & Whitney LLP

(57) ABSTRACT

An aerial vehicle securing system for use with a base portion of an aerial vehicle, comprising: at least one substantially flat platform for supporting said base portion upon landing of the vehicle thereon; at least one magnetizable element configured to be integrated in one of said platform or base portion; at least one electropermanent magnet configured to be integrated in another one of said platform or base portion, said electropermanent magnet configured for generating a magnetic field, so that upon a distance between said base portion and said platform reaching a pre-determined value during the landing of the vehicle on the platform, said magnetic field is configured to cause magnetizable element to be attracted to at least said one electropermanent magnet; and a power supply module configured for generating an
(Continued)

electric current to said at least one electropermanent magnet for selectively generating and cancelling said magnetic field.

13 Claims, 3 Drawing Sheets

(56) References Cited

U.S. PATENT DOCUMENTS

| | | | |
|---|---|---|---|
| 4,311,290 | A | 1/1982 | Koper |
| 4,523,729 | A | 6/1985 | Frick |
| 4,890,802 | A | 1/1990 | Burgess et al. |
| 5,799,900 | A | 9/1998 | Mcdonnell |
| 6,016,997 | A | 1/2000 | Wendt et al. |
| 6,527,226 | B1 | 3/2003 | Clifford et al. |
| 7,114,680 | B2 | 10/2006 | Dennis |
| 7,219,856 | B2 | 5/2007 | Watts et al. |
| 7,510,145 | B2 | 3/2009 | Snediker |
| 8,028,952 | B2 | 10/2011 | Urnes, Sr. |
| 8,162,256 | B2 | 4/2012 | Goossen et al. |
| 8,172,177 | B2 | 5/2012 | Lovell et al. |
| 8,955,800 | B2 | 2/2015 | Mcgeer et al. |
| 9,434,481 | B2 | 9/2016 | Mcgeer |
| 9,481,458 | B2 * | 11/2016 | Casado Magana ... B60L 3/0046 |
| 10,007,272 | B2 * | 6/2018 | Tirpak .................... G05D 1/0676 |
| 10,509,416 | B2 * | 12/2019 | Wang ...................... G01S 19/42 |
| 10,899,445 | B2 * | 1/2021 | Augugliaro ............... B64F 1/16 |
| 10,971,292 | B2 * | 4/2021 | Arnold ..................... H01F 7/20 |
| 11,130,594 | B2 * | 9/2021 | Kim ....................... B64F 1/007 |
| 2006/0249622 | A1 | 11/2006 | Steele |
| 2008/0156932 | A1 | 7/2008 | Mcgeer et al. |
| 2009/0023647 | A1 | 1/2009 | Stegmann et al. |
| 2011/0024559 | A1 | 2/2011 | Mcgeer et al. |
| 2013/0001366 | A1 | 1/2013 | Wolff et al. |
| 2013/0161447 | A1 | 6/2013 | Mcgeer et al. |
| 2014/0070052 | A1 | 3/2014 | Kang |
| 2014/0319272 | A1 * | 10/2014 | Casado Magana ..... B60L 53/14 |
| | | | 244/110 E |
| 2015/0239578 | A1 | 8/2015 | Mcgeer |
| 2016/0114906 | A1 | 4/2016 | Mcgeer et al. |
| 2016/0280359 | A1 | 9/2016 | Semke et al. |
| 2017/0038778 | A1 * | 2/2017 | Wang ...................... G01S 19/42 |
| 2017/0113815 | A1 | 4/2017 | James et al. |
| 2017/0275024 | A1 * | 9/2017 | Bennett ................ G05D 1/0022 |
| 2018/0039286 | A1 * | 2/2018 | Tirpak ..................... B64F 1/00 |
| 2018/0079531 | A1 * | 3/2018 | Bennett ................ G05D 1/0011 |
| 2018/0237161 | A1 * | 8/2018 | Minnick ................. B60L 53/14 |
| 2019/0168888 | A1 * | 6/2019 | Kim ...................... B64C 39/024 |
| 2020/0117218 | A1 * | 4/2020 | Wang ..................... B64C 39/024 |
| 2020/0165007 | A1 * | 5/2020 | Augugliaro ............... B64F 1/16 |
| 2021/0107648 | A1 * | 4/2021 | Augugliaro ........... H02J 7/0042 |
| 2021/0292006 | A1 * | 9/2021 | Kim ........................ B60J 7/022 |

FOREIGN PATENT DOCUMENTS

| | | |
|---|---|---|
| CN | 206691358 U | 12/2017 |
| DE | 4301671 A1 | 7/1993 |
| DE | 102014016914 A1 | 5/2016 |
| GB | 1063652 A | 3/1967 |
| GB | 2075931 A | 11/1981 |
| KR | 20150057619 A | 5/2015 |
| WO | 2013055265 A1 | 4/2013 |
| WO | 2016137982 A1 | 9/2016 |

OTHER PUBLICATIONS

"Flexrotor—About the Flexrotor Unmanned Aerial System", Aerovel Corporation, /https://aerovel.com/flexrotor last accessed Jul. 31, 2019, 3 pages.
"Flexrotor Aboard Ship", Aerovel Corporation, /https://aerovel.com/applications last accessed Jul. 31, 2019, 2 pages.
"Flexrotor UAV", www.navaldrones.com/flexrotor.html last accessed Jul. 31, 2019, 3 pages.
"Innovative UAV to be Shown at Composites European Conference", Aero-News Network, www.aero-news.net/index.cfm?do=main.textpost&id=050db657-c512-4241-b5e5-c930778ea626 last accessed Jul. 31, 2019, Nov. 30, 2016, 1 page.
"Lightening Strike Protection Strategies for Composite Aircraft", CompositesWorld, https://www.compositesworld.com/articles/lightning-strike-protection-strategies-for-composite-aircraft last accessed Jul. 31, 2019, May 1, 2013, 12 pages.
"MQ-4 Triton & RQ-4 Global Hawk Thread", SinoDefenceForum China's Armed Forces, Security, Aerospace, /https://www.sinodefenceforum.com/mq-4c-triton-rq-4-global-hawk-thread.t7333 last accessed, May 12, 2015, 18 pages.
"SideArm Prototype Catches Full-Size Unmanned Aerial System Flying at Full Speed", https://www.darpa.mil/news-events/2017-02-06 last accessed Jul. 31, 2019, Jun. 2, 2017, 3 pages.
"The Engineer's guide to Design & Manufacturing Advances", Aerospace & Defense Technology, https://www.sae.org/magazines/pdf/14AERP05.pdf, May 2014, 50 pages.
"The Puffin: A Passion for Personal Flight", NASA, https://www.nasa.gov/topics/technology/features/puffin.html last accessed Jul. 31, 2019, Aug. 2, 2010, 2 pages.

* cited by examiner

AERIAL VEHICLE SECURING SYSTEM AND METHOD

TECHNOLOGICAL FIELD

The presently disclosed subject matter relates to systems and methods for securing objects, and more particularly, to systems and methods for capturing and securing aerial vehicles.

BACKGROUND

Various aerial vehicles, and for example, manned and unmanned VTOL (vertical takeoff and landing) aerial vehicles have become increasingly important in latest years, to perform both military and civil operations for which actual runways are not available. In different scenarios, it is required for an aerial vehicle to land on a landing platform and to be relaunched from it. The landing platform can be disposed on or be part of a ship's deck, or any other moving vehicle on land.

For example, US 2015/0239578 discloses an apparatus and method for launch and retrieval of a hovering aircraft. The apparatus of the present disclosure is configured to capture a hovering aircraft between two or more fingers of an aircraft capturer, guide the captured aircraft into a docking station for servicing and/or storage, and launch the aircraft from the docking station. The apparatus is configured to bring the aircraft from an imprecise, irregular hover into a secure and well-controlled rest state.

GENERAL DESCRIPTION

According to one aspect of the presently disclosed subject matter, there is provided an aerial vehicle securing system for use with a base portion of an aerial vehicle, comprising:

at least one substantially flat platform for supporting said base portion upon landing of the aerial vehicle thereon;

at least one magnetizable element configured to be integrated in one of said platform and said base portion;

at least one electropermanent magnet configured to be integrated in another one of said platform and said base portion, said electropermanent magnet being configured for generating a magnetic field, so that upon a distance between said base portion and said platform reaching a pre-determined value during the landing of the aerial vehicle on the platform, said magnetic field is configured to cause at least said one magnetizable element to be attracted to at least said one electropermanent magnet;

a power supply module configured for generating an electric current to at least said one electropermanent magnet for selectively generating and cancelling said magnetic field; and a controlling module configured for controlling supply of said electric current.

The aerial vehicle securing system of the presently disclosed subject matter is configured to be used for capturing and securing an aerial vehicle that lands on a static or a dynamic platform. The platform can be mounted to, disposed on, or be part of any known object on which aerial vehicles usually land. This object can be, for example, a landing deck of a ship, a land vehicle, or any other known in the art aerial vehicle carrier. The aerial vehicle securing system uses magnetic forces generated by an electropermanent magnet to easily capture and secure an aerial vehicle, and easily release the aerial vehicle upon a respective command that cancels these magnetic forces, possibly, without intervention or with minimal intervention of a human being.

The electropermanent magnet of the presently disclosed subject matter is a type of permanent magnet in which the external magnetic field can be switched on or off by a pulse of electric current in a wire winding around part of the magnet. The magnet consists of two sections, one of "hard" (high coercivity) permanent magnetic material and another one of "soft" (low coercivity) permanent magnetic material. The direction of magnetization in said another piece can be switched by a pulse of current in a wire winding about it. When the magnetically soft and hard materials have opposing magnetizations, the electropermanent magnet produces no net external field across its poles, while when their direction of magnetization is aligned, the electropermanent magnet produces an external magnetic field that can attract the magnetizable element(s). The magnetic field generated by the electropermanent magnet is produced not by electric currents and this is the main difference with the electromagnets. The electropermanent magnet is thus very powerful, it doesn't generate heat and has no moving parts. The electropermanent magnet uses only a pulse of current to magnetize in a desired direction the section made of the "soft" (low coercivity) permanent magnetic material. After changing the direction of the magnetization, no electric current is needed. Therefore, the electropermanent magnet is efficient in energy consumption, and most of the time does not require an electric energy to generated the external magnetic field. The use of the electropermanent magnet is also convenient when used in areas sensitive to magnetic field. For example, when the platform is mounted on a deck of a ship, the magnetic field generated by the electropermanent magnet can be easily cancelled when there is no need to secure an aerial vehicle. However, upon arrival of an aerial vehicle, the magnetic field can be quickly and easily generated by the electropermanent magnet upon a respective command. The electropermanent magnet can also be used by securing different types of aerial vehicles, without making particular changes for each type of an aerial vehicle.

The aerial vehicle securing system allows capturing an aerial vehicle approaching it without using any moving elements, and it can be structured to be wide enough so that the aerial vehicle can land and be secured at a variety of locations thereon. This can simplify the process of landing and securing the aerial vehicle, without the need to estimate the status of the platform and/or the aerial vehicle at any given time in order to direct the landing aerial vehicle to approach it correctly.

The term 'aerial vehicle' refers hereinafter to any known in the art vehicle that is configured to land on a supporting platform by its own landing system or by an external landing supporting system, and can be, for example, an aircraft, a VTOL, a helicopter, an unmanned aerial vehicle, a drone, a space vehicle, and a land vehicle. The base portion of the aerial vehicle can be any of the following: skids, wheels, lower supporting member(s), legs, etc.

According to a particular example, the at least one electropermanent magnet is integrated in the platform, and the at least one magnetizable element is integrated in the base portion. According to a more particular example, the electropermanent magnet and the platform are integrated in a single member.

The aerial vehicle securing system can further comprise at least one shock absorbing member associated with at least one of: said platform, at least said one magnetizable element and at least said one electropermanent magnet.

The one or more shock absorbing members can be integral with said magnetizable element or said platform.

The aerial vehicle securing system can further comprise at least one pivotal member associated with at least one of: at least said one magnetizable element and at least said one electropermanent magnet, and configured for spatial pivoting to minimize the angle between a contact surface of the magnetizable element and a contact surface of the respective electropermanent magnet.

The at least one pivotal member can include said magnetizable element or said electropermanent magnet. According to a particular example in which the aerial vehicle securing system comprises one or more pivotal members, each provided with a magnetizable element, it is appreciated that in a scenario in which the aerial vehicle lands on the platform at an angled orientation, the pivoting allows easily and immediately magnetically attracting the magnetizable element that contacts the platform, thereby facilitating the securing of the entire aerial vehicle to the platform.

The shock absorbing member and the pivotal member can be integrated in a single absorbing-pivotal member.

The controlling module can be configured for receiving a releasing command, and upon receipt of said releasing command, said controlling module is configured for instructing said power supply module to generate the electric current to cancel the magnetic field. The releasing command can be transferred to the controlling module wirelessly.

The releasing command can be configured to be generated upon exceedance of a predetermined threshold parameter indicative of Revolutions Per Minute (RPM) of the aerial vehicle's motor.

The at least one magnetizable element can be constituted by two or more magnetizable elements integrated in said base portion, and at two opposite sides of a center of gravity of the aerial vehicle or symmetrically with respect to a longitudinal axis of the aerial vehicle.

The platform can be foldable.

The platform can comprise a locomotion mechanism for transporting said platform with said aerial vehicle while being secured thereto.

The at least one magnetizable element can be a ferromagnetic element or an electromagnetic element.

The at least one electropermanent magnet can comprise an upper flat surface. The upper flat surface can be substantially parallel to a bottom surface of the platform. The flatness of the upper surface of the electropermanent magnet provides an ability for the aerial vehicle to land on any particular location thereon without precisely landing on a particular predetermined location or position, and this can be highly important in real life difficult conditions (e.g., wind, rain, unstable platform of a ship in a sea, limited visibility) at which aerial vehicles land.

The at least one electropermanent magnet or said platform can comprise one or more delimiting portions extending from its upper surface for delimiting displacement of the base portion.

An upper surface of at least the one electropermanent magnet can be characterized by a friction coefficient which is greater than a friction coefficient of an exterior surface of at least said one magnetizable element.

According to another aspect of the presently disclosed subject matter, there is provided a method for securing an aerial vehicle having a base portion by an aerial vehicle securing system, said method comprising steps of:

providing said aerial vehicle securing system comprising: at least one substantially flat platform for supporting said base portion upon landing of the aerial vehicle thereon; at least one magnetizable element configured to be integrated in one of said platform and said base portion; at least one electropermanent magnet configured to be integrated in another one of said platform and said base portion, said electropermanent magnet being configured for generating a magnetic field, so that upon a distance between said base portion and said platform reaching a pre-determined value during the landing of the aerial vehicle on the platform, said magnetic field is configured to cause at least said one magnetizable element to be attracted to at least said one electropermanent magnet; a power supply module; and a controlling module; and while said aerial vehicle being secured to said platform by said magnetic field, instructing said power supply by said controlling unit to supply of an electric current to at least said one electropermanent magnet for cancelling said magnetic field.

The method can further comprise a step of receiving a releasing command at the controlling module, and upon receipt of said releasing command, performing said step of instructing said power supply by said controlling unit to supply of an electric current to said electropermanent magnet for cancelling said magnetic field.

The releasing command can be configured to be generated upon exceedance of a predetermined threshold parameter indicative of Revolutions Per Minute (RPM) of the aerial vehicle's motor.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
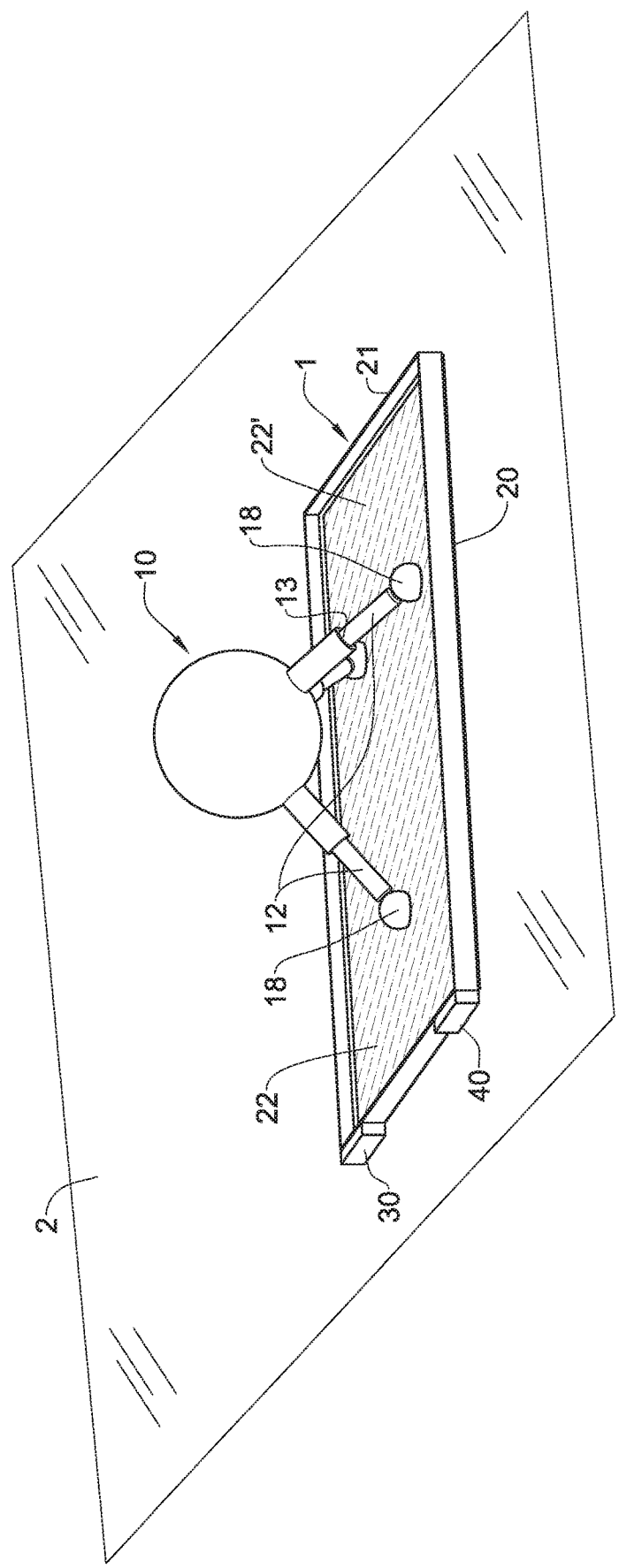
FIG. 1A is a perspective view of an aerial vehicle securing system, in accordance with one example of the presently disclosed subject matter, with an aerial vehicle secured thereto.
Figure 1B:
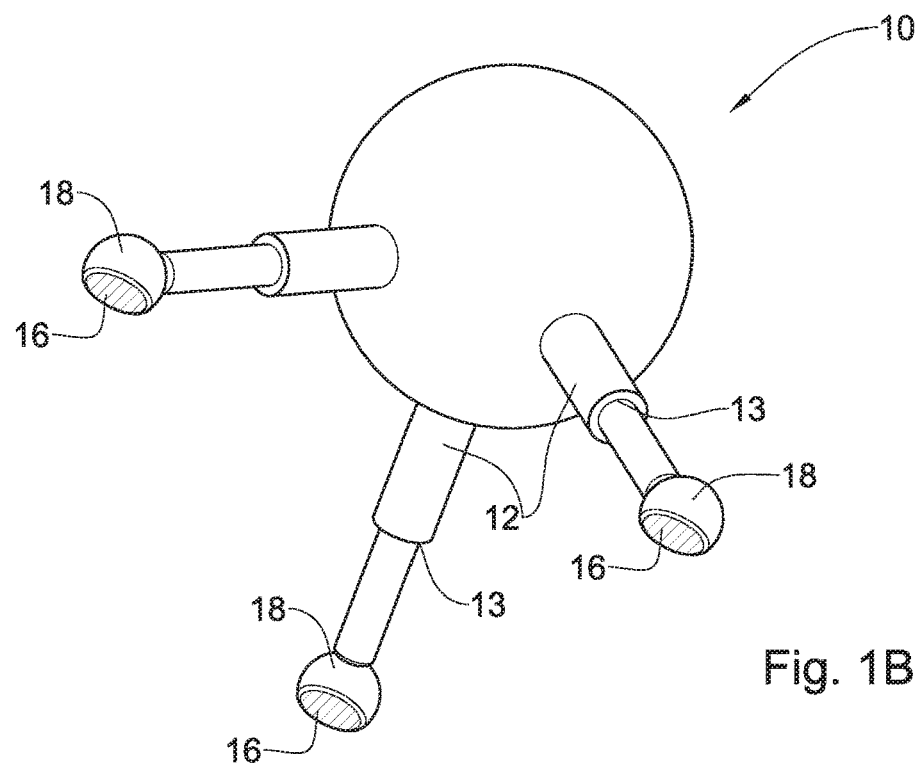
FIG. 1B is a bottom perspective view of the aerial vehicle of FIG. 1A.

Attention is first directed to FIGS. 1A and 1B of the drawings illustrating one example of aerial vehicle securing system of the presently disclosed subject matter, generally designated as 1, together with an aerial vehicle 10.

The aerial vehicle securing system 1 is configured to be used for securing the aerial vehicle 10 that lands on a static or a dynamic platform by means of magnetic forces. The aerial vehicle securing system 1 comprises a substantially flat platform 20 that can be mounted to, disposed on, or be part of any known object (not shown) on which aerial vehicles usually land. This object can be, for example, a landing deck of a ship, a land vehicle, or any other known in the art aerial vehicle carrier. According to the example of FIG. 1A, the platform 20 is disposed on a landing deck 2 of a ship. As detailed below, the aerial vehicle securing system 1 uses magnetic forces generated by an electropermanent magnet to easily capture and secure the aerial vehicle 10, and easily release the aerial vehicle 10 upon a respective command that cancels these magnetic forces, possibly, without intervention or with minimal intervention of a human being.

The aerial vehicle 10 shown in FIGS. 1A and 1B is a schematic illustration of a UAV having a base portion, in the form of three legs 12. The platform 20 is configured for supporting said legs 12 upon landing of the aerial vehicle 10 thereon.

In addition to the platform 20, the aerial vehicle securing system further comprises: three magnetizable elements in a form of ferromagnetic plates 16 (shown in FIG. 1B) connected to distal ends 18 of the legs 12; an electropermanent magnet 22 integrated in the platform 20 to a single member; a power supply module 30; and a controlling module 40.

As seen in FIG. 1A, the electropermanent magnet 22 has an upper flat surface 22'. The upper flat surface 22 is parallel to a bottom surface of the platform 20. The flatness of the upper surface 22' provides an ability for the aerial vehicle 10 to land on any particular location thereon without precisely landing on a particular predetermined location or position, and this can be highly important in real life difficult conditions (e.g., wind, rain, unstable platform of a ship in a sea, limited visibility) at which aerial vehicles land. The platform 20 has a delimiting portion 21 extending from its upper surface for delimiting displacement of the distal ends 18. According to a particular example, the upper surface 22' can be characterized by a friction coefficient which is greater than a friction coefficient of an exterior surface of the ferromagnetic plates 16.

The electropermanent magnet 22 is configured for generating a magnetic field for magnetically attracting the ferromagnetic plates 16, and thereby securing the aerial vehicle 10 to the platform 20. The magnetic field generated by the electropermanent magnet 22 is such that upon a distance of between said distal ends 18 and the platform 20 reaching a pre-determined value of, e.g. 5 mm, during the landing of the aerial vehicle 10 on the platform 20, the magnetic field is configured to cause the ferromagnetic plates 16 to be magnetically attracted to the electropermanent magnet 22, and thereby facilitating the landing process and the securing of the aerial vehicle 10 to the platform 20. The electropermanent magnet 22 of the presently disclosed subject matter is a type of permanent magnet in which the external magnetic field can be switched on or off by a pulse of electric current in a wire winding around part of the magnet. The magnet consists of two sections, one of "hard" (high coercivity) permanent magnetic material and another one of "soft" (low coercivity) permanent magnetic material. The direction of magnetization in said another piece can be switched by a pulse of current in a wire winding about it. When the magnetically soft and hard materials have opposing magnetizations, the electropermanent magnet 22 produces no net external field across its poles, while when their direction of magnetization is aligned, the electropermanent magnet 22 produces an external magnetic field that can attract the ferromagnetic plates 16. The magnetic field generated by the electropermanent magnet 22 is produced not by electric currents and this is the main difference with the electromagnets. The electropermanent magnet 22 is thus very powerful, it doesn't generate heat and has no moving parts. The electropermanent magnet 22 uses only a pulse of current to magnetize in a desired direction the section made of the "soft" (low coercivity) permanent magnetic material. After changing the direction of the magnetization, no electric current is needed. Therefore, the electropermanent magnet 22 is efficient in energy consumption, and most of the time does not require an electric energy to generate the external magnetic field. The use of the electropermanent magnet 22 is also convenient when used in areas sensitive to magnetic field. For example, when the platform 20 is mounted on a deck of a ship, the magnetic field generated by the electropermanent magnet 22 can be easily cancelled when there is no need to secure an aerial vehicle. However, upon arrival of an aerial vehicle, the magnetic field can be quickly and easily generated by the electropermanent magnet 22 upon a respective command.

The electropermanent magnet 22 is in electric communication with the power supply module 30, which is configured for generating the pulse of the electric current to electropermanent magnet 22 for selectively generating and cancelling said external magnetic field. The controlling module 40 is in electric communication with the power supply module 30 for controlling supply of the electric current.

For example, before the aerial vehicle 10 lands on the platform 20, the controlling module 40 is configured for receiving a securing command from an operator, or from another source. Upon receipt of the securing command, it is configured to generate a pulse of an electric current to electropermanent magnet 22 for generating the external magnetic field. This causes the electropermanent magnet 22 to be ready for receiving thereon the aerial vehicle 10 for securing the aerial vehicle upon its landing by external magnetic field.

When the aerial vehicle 10 is secured to electropermanent magnet 22, the controlling module 40 is configured for receiving a releasing command from an operator, or from another source. Upon receipt of the releasing command, the controlling module 40 is configured for instructing the power supply module 30 to generate a pulse of an electric current to cancel the external magnetic field, and thereby allow the aerial vehicle to take off. The securing command and/or the releasing command can be transferred to the controlling module 40 wirelessly.

According to a particular example, the releasing command can generate upon exceedance of a predetermined threshold parameter indicative of Revolutions Per Minute (RPM) of the aerial vehicle's motor. For example, if the aerial vehicle is intended to take off, and its engine is activated, a releasing command can be transferred from the aerial vehicle to the controlling unit 40. The threshold parameter can be a particular engine force causing the aerial vehicle 10 to take off and be disconnected from the electropermanent magnet 22. When this engine force is greater than a particular threshold, the releasing command can automatically be generated and received at the controlling unit 40, in turn cancelling the external magnetic field.

According to other examples not shown in the drawings, the electropermanent magnet 22 can be constituted by an array of electropermanent magnets. The electropermanent magnets can be equally spaced from each other.

Each one of the legs 12 has a shock absorbing member in the form of a pistol.

Each one of the distal ends 18 is a pivotal member configured for 3D rotation with respect to the rest of the leg 12. The distal ends 18 are thus configured for spatially pivoting upon landing of the aerial vehicle 10 on the electropermanent magnet 22 to minimize the angle between a contact surface of the respective ferromagnetic plate 16 and the upper surface 22' of the electropermanent magnet 22.

According to the example of FIGS. 1A and 1B, it is appreciated that in a scenario in which the aerial vehicle 10 lands on the electropermanent magnet 22 at an angled orientation, the pivoting of the distal ends 18 allows easily and immediately magnetically attracting the ferromagnetic plates 16 that contact the platform, thereby facilitating the securing of the aerial vehicle 10 to the platform 20.

The ferromagnetic plates 16 are arranged such that the center of gravity of the aerial vehicle 10 is located therebetween at an equal distance from each one of the ferromagnetic plates 16. Placing the ferromagnetic plates 16 with respect to the center of gravity of the aerial vehicle 10 in such a manner allows properly securing the aerial vehicle 10 to the platform 20.

Figure 3:
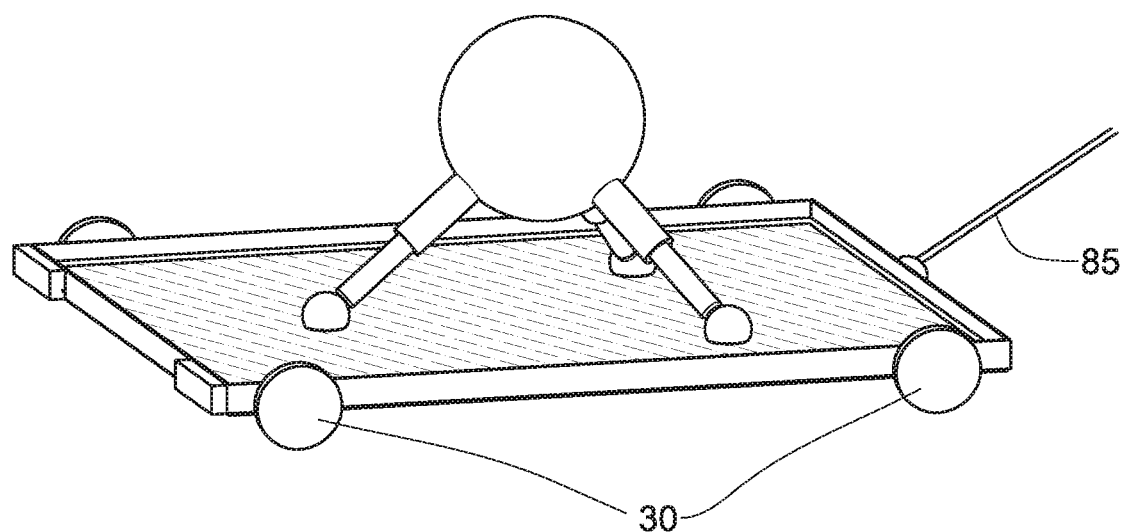
FIG. 3 is a perspective view of an aerial vehicle securing system, in accordance with another example of the presently disclosed subject matter, with an aerial vehicle secured thereto.

Although not illustrated, the platform 20 can be foldable with respect to the body to which it is mounted. As shown in FIG. 3, the platform 20 can also comprise a locomotion mechanism in the form of wheels 80 for transporting the platform 20 with the aerial vehicle 10 while being secured thereto. The locomotion mechanism further comprises a dragging member 85 for dragging the platform 20 together with the aerial vehicle secured to another location.

According to another example, the magnetizable element can be an electromagnetic element, which can be magnetically attracted to the electropermanent magnet 22 when an electric current is supplied thereto.

Figure 2:
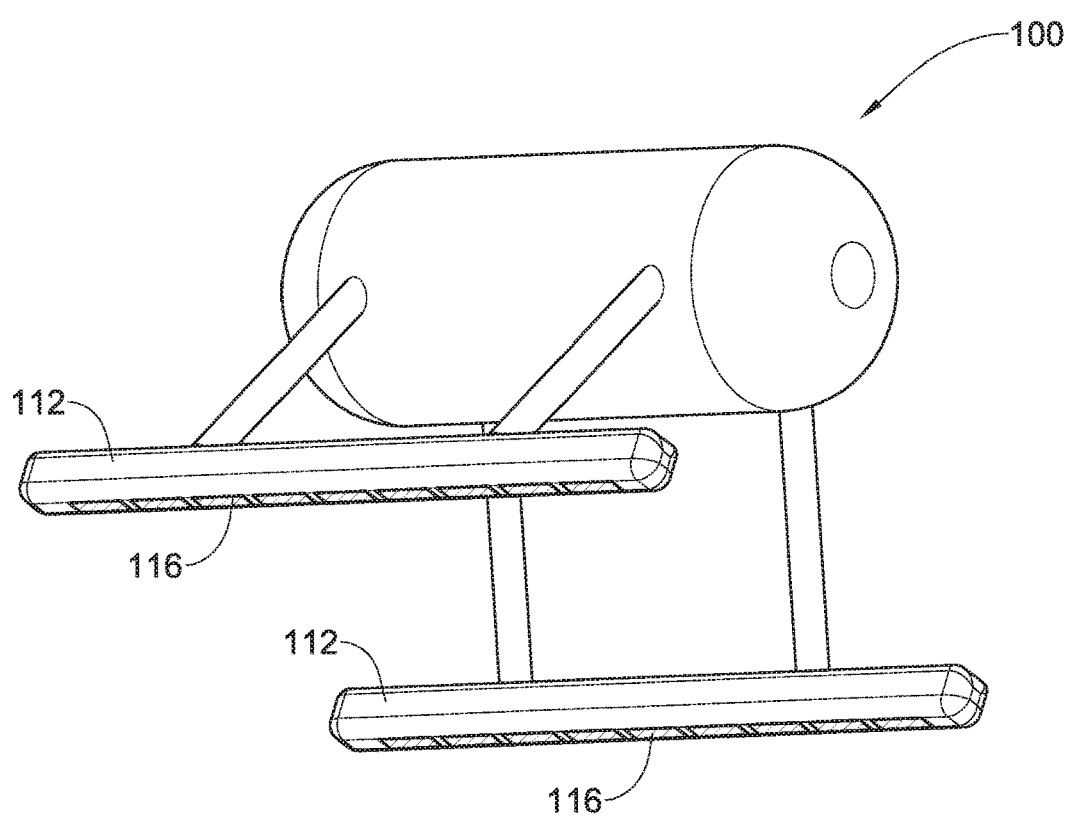
FIG. 2 is a bottom perspective view of another aerial vehicle to be secured by the aerial vehicle securing system of FIG. 1A.

Reference is now made to FIG. 2 in which another aerial vehicle 110 is shown. The aerial vehicle 110 is a schematic illustration of a helicopter having a base portion in the form of two skids 112. The platform 20 is configured for supporting the skids 112 upon landing of the aerial vehicle 110 thereon.

The aerial vehicle 110 also has eighteen magnetizable elements in the form of ferromagnetic plates 116. Each nine ferromagnetic plates 116 are connected to their respective skid of the skids 112. The aerial vehicle 110 is configured for landing on the platform 20, and to be magnetically secured to the electropermanent magnet 22, when its external magnetic field is generated. Therefore, both aerial vehicles 110 and 10 can be used in conjunction with the platform 20 and be secured by the electropermanent magnet 22. The ferromagnetic plates 116 are arranged so that the center of gravity of the aerial vehicle 110 is disposed therebetween.

Placing the ferromagnetic plates 116 with respect to the center of gravity of the aerial vehicle 110 in such a manner allows properly securing the aerial vehicle 110 to the platform 20.

The invention claimed is:

1. An aerial vehicle securing system for use with a base portion of an aerial vehicle, the aerial vehicle securing system comprising:
    at least one substantially flat platform having an upper surface for supporting said base portion upon landing of the aerial vehicle thereon;
    at least one magnetizable element configured to be integrated in said base portion;
    at least one electropermanent magnet having an upper flat surface and configured to be integrated in said at least one substantially flat platform, said upper flat surface being configured to constitute a majority of said upper surface of said at least one substantially flat platform, said at least one electropermanent magnet including at least two sections, each of the at least two sections includes permanent magnetic material, being configured for generating a net magnetic field, so that upon a distance between said base portion and said at least one substantially flat platform reaching a pre-determined value during the landing of the aerial vehicle on the platform, said net magnetic field is configured to cause said at least one magnetizable element to be attracted to said at least one electropermanent magnet;
    a power supply module configured for generating an electric pulse of current to said at least one electropermanent magnet for selectively generating and cancelling said net magnetic field, wherein at least one of the at least two sections is configured for changing a direction of magnetization thereof in response to said electric pulse of current, thereby selectively generating and cancelling said net magnetic field; and
    a controlling module configured for controlling supply of said electric pulse of current.

2. The aerial vehicle securing system according to claim 1, wherein said at least one magnetizable element is constituted by two or more magnetizable elements integrated in said base portion, and at two opposite sides of a center of gravity of the aerial vehicle or symmetrically with respect to a longitudinal axis of the aerial vehicle.

3. The aerial vehicle securing system according to claim 1, wherein said at least one substantially flat platform includes a locomotion mechanism for transporting said at least one substantially flat platform with said aerial vehicle while being secured thereto.

4. The aerial vehicle securing system according to claim 1, wherein said at least one magnetizable element includes a ferromagnetic element or an electromagnetic element.

5. The aerial vehicle securing system according to claim 1, wherein said upper flat surface of the at least one electropermanent magnet is substantially parallel to a bottom surface of the at least one substantially flat platform.

6. The aerial vehicle securing system according to claim 1, wherein said at least one electropermanent magnet or said at least one substantially flat platform includes one or more delimiting portions extending from the upper surface thereof for delimiting displacement of the base portion.

7. The aerial vehicle securing system according to claim 1, wherein the upper flat surface of said at least one electropermanent magnet is characterized by a friction coefficient that is greater than a friction coefficient of an exterior surface of said at least one magnetizable element.

8. The aerial vehicle securing system according to claim 1, wherein said controlling module is configured for receiving a releasing command, and upon receipt of said releasing command, said controlling module is configured for instructing said power supply module to generate the electric pulse of current to cancel the net magnetic field.

9. The aerial vehicle securing system according to claim 8, wherein said releasing command is configured to be generated upon exceedance of a predetermined threshold parameter indicative of an intentional take-off of the aerial vehicle.

10. The aerial vehicle securing system according to claim 8, wherein said releasing command is configured to be generated upon exceedance of a predetermined threshold parameter indicative of Revolutions Per Minute (RPM) of the aerial vehicle's motor.

11. A method for securing an aerial vehicle having a base portion by an aerial vehicle securing system, said method comprising:
    providing said aerial vehicle securing system including: at least one substantially flat platform having an upper surface for supporting said base portion upon landing of the aerial vehicle thereon; at least one magnetizable element configured to be integrated in said base portion; at least one electropermanent magnet having an upper flat surface and configured to be integrated in said at least one substantially flat platform, said upper flat surface being configured to constitute a majority of said upper surface of said at least one substantially flat platform, said at least one electropermanent magnet including at least two sections, each of the at least two sections including permanent magnetic material, being configured for generating a net magnetic field, so that upon a distance between said base portion and said at least one substantially flat platform reaching a predetermined value during the landing of the aerial vehicle on the at least one substantially flat platform, said net magnetic field is configured to cause said at least one magnetizable element to be attracted to said at least one electropermanent magnet, wherein at least one of the at least two sections is configured for changing a direction of its magnetization in response to an electric pulse of current for selectively generating and cancelling said net magnetic field; a power supply module; and a controlling module; and while said aerial vehicle being secured to said at least one substantially flat platform by said net magnetic field, instructing said power supply module by said controlling unit to control supply of the electric pulse of current to said at least one electropermanent magnet for cancelling said net magnetic field.

12. The method according to claim 11, further comprising receiving a releasing command at the controlling module, and upon receipt of said releasing command, performing said instructing said power supply module by said controlling unit to control supply of the electric pulse of current to said at least one electropermanent magnet for cancelling said net magnetic field.

13. The method according to claim 12, wherein said releasing command is configured to be generated upon exceedance of a predetermined threshold parameter indicative of Revolutions Per Minute (RPM) of the aerial vehicle's motor.

* * * * *